US008253774B2

(12) United States Patent
Huitema et al.

(10) Patent No.: US 8,253,774 B2
(45) Date of Patent: Aug. 28, 2012

(54) AMBULATORY PRESENCE FEATURES

(75) Inventors: Christian Huitema, Clyde Hill, WA (US); William A. S. Buxton, Toronto (CA); John E. Paff, Redmond, WA (US); Zicheng Liu, Bellevue, WA (US); Rajesh Kutpadi Hegde, Redmond, WA (US); Zhengyou Zhang, Bellevue, WA (US); Kori Marie Quinn, Redmond, WA (US); Jin Li, Sammamish, WA (US); Michel Pahud, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 735 days.

(21) Appl. No.: 12/413,782

(22) Filed: Mar. 30, 2009

(65) Prior Publication Data

US 2010/0245536 A1      Sep. 30, 2010

(51) Int. Cl.
*H04N 7/14*      (2006.01)
(52) U.S. Cl. ............... 348/14.08; 348/14.12; 348/14.04
(58) Field of Classification Search .... 348/14.01–14.16; 709/204, 228
See application file for complete search history.

(56) References Cited

U.S. PATENT DOCUMENTS

| 6,894,714 B2* | 5/2005 | Gutta et al. ................ 348/14.07 |
| 2005/0078172 A1* | 4/2005 | Harville et al. ............ 348/14.09 |
| 2009/0079813 A1* | 3/2009 | Hildreth ..................... 348/14.03 |

FOREIGN PATENT DOCUMENTS

WO    WO 2008119177 A1 * 10/2008

OTHER PUBLICATIONS

"Motion Capture" Wikipedia http://en.wikipedia.org/wiki/Motion_capture last viewed Mar. 27, 2009, 9 pages.

* cited by examiner

*Primary Examiner* — Melur Ramakrishnaiah
(74) *Attorney, Agent, or Firm* — Lee & Hayes, PLLC

(57) ABSTRACT

The claimed subject matter provides a system and/or a method that facilitates managing one or more devices utilized for communicating data within a telepresence session. A telepresence session can be initiated within a communication framework that includes two or more virtually represented users that communicate therein. A device can be utilized by at least one virtually represented user that enables communication within the telepresence session, the device includes at least one of an input to transmit a portion of a communication to the telepresence session or an output to receive a portion of a communication from the telepresence session. A detection component can adjust at least one of the input related to the device or the output related to the device based upon the identification of a cue, the cue is at least one of a movement detected, an event detected, or an ambient variation.

20 Claims, 10 Drawing Sheets

AMBULATORY PRESENCE FEATURES

BACKGROUND

Computing and network technologies have transformed many aspects of everyday life. Computers have become household staples rather than luxuries, educational tools and/or entertainment centers, and provide individuals and corporations with tools to manage and forecast finances, control operations such as heating, cooling, lighting and security, and store records and images in a permanent and reliable medium. Networking technologies like the Internet provide individuals virtually unlimited access to remote systems, information and associated applications.

In light of such advances in computer technology (e.g., devices, systems, memory, wireless connectivity, bandwidth of networks, etc.), mobility for individuals have greatly. For example, with the advent of wireless technology, emails and other data can be communicated and received with a wireless communications device such as a cellular phone, smartphone, portable digital assistant (PDA), and the like. As a result, physical presence for particular situations has drastically reduced or been reduced. In an example, a business meeting between two or more individuals can be conducted virtually in which the two or more participants interact with one another remotely. Such virtual meetings that can be conducted with remote participants can be referred to as a telepresence session.

Traditional virtual meetings include teleconferences, web-conferencing, or desktop/computer sharing. Yet, each virtual meeting may not sufficiently replicate or simulate a physical meeting. A virtually represented user can interact and communicate data within a telepresence session by leveraging devices with inputs and outputs. One shortcoming associated with conventional telepresence systems is the inherent restrictions placed upon collaboration participants. In essence, participants are traditionally physically bound to narrow confines about the desktop or other device facilitating the collaboration. With users having numerous devices and such devices having various capabilities and functionalities, options for connectivity with a telepresence session has been increased. Users are thus faced with a plethora of options for connectivity.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate selecting a device and/or adjusting an input or output related to the selected device based upon a detected cue. A detection component can evaluate the available devices utilized to interact or communicate with a telepresence session. Based on available devices, the detection component can select an optimal device in connection with the identification of a cue, wherein the cue is a detected movement, a detected event, or an ambient variation. In other words, the detection component can optimally select which devices to activate for in order to communicate within the telepresence session. In addition, the detection component can automatically adjust or adapt a setting associated with the device such as a device input or a device output.

When, for example, moving from the desktop to a whiteboard several feet away, it become more difficult to view and hear the other members of the group. Accordingly, the subject innovation relates to a telepresence system that can adapt to ambulatory characteristics of the participant. In one aspect, the visual feature of a display (and volume for speakers) can automatically increase in size or magnification scale when a participant moves away from a designated space. In another case, in connection with a projector or other hardware, the display can be projected to a surface that is more local to the participant. Moreover, this new output can move with the participant and even position itself based upon the participant's posture, angle, or gaze direction. Ultimately, the detection component can follow the participant to other rooms to be output on local devices, be transferred to, say, a laptop when there are no other suitable I/O devices present, and even transfer to a cell phone (and/or Bluetooth ear bug) when necessary in a manner that is platform independent, utilizing the available hardware in a suitable manner for information flow in either direction. Overall, the subject innovation can seamlessly (or with a minimum of distraction) transfer the task space and the remote participant(s) when the local participant(s) move. Also, from the remote participant(s) view, the subject innovation can enable the system to make a seamless transition and keep as much as possible the same gaze and geometry between participants.

Furthermore, a buffer component can track or record a portion of the telepresence session in the instance where a participant is temporarily absent. During such absence, the buffer component can track and store data (e.g., a portion of audio, a portion of video, a portion of text, etc.), wherein such tracked data can be accessed or delivered to the returning user to enable a playback. The buffer component can further employ an intelligent process (e.g., compress, speed up the playback of the buffered content, etc.). For example, the buffer component can delete or skip long gaps in the buffered content (e.g., boring bits). Furthermore, the buffer component can provide the ability to intelligently detect tone (e.g., excitement, animation, urgency via volume, pace (short gaps between speakers), etc.) and tag for rapid playback of the most important bits (e.g., useful in public safety, emergency situation, or black box type of application, etc.). The buffer component can further combine with voice recognition and tagging to provide cueing as well as forensic benefits in public safety or black box applications. The buffer component can further create a summary and enable participants to "catch up" with missed portions of the session. In other aspects of the claimed subject matter, methods are provided that facilitate managing device selection or input/output settings.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
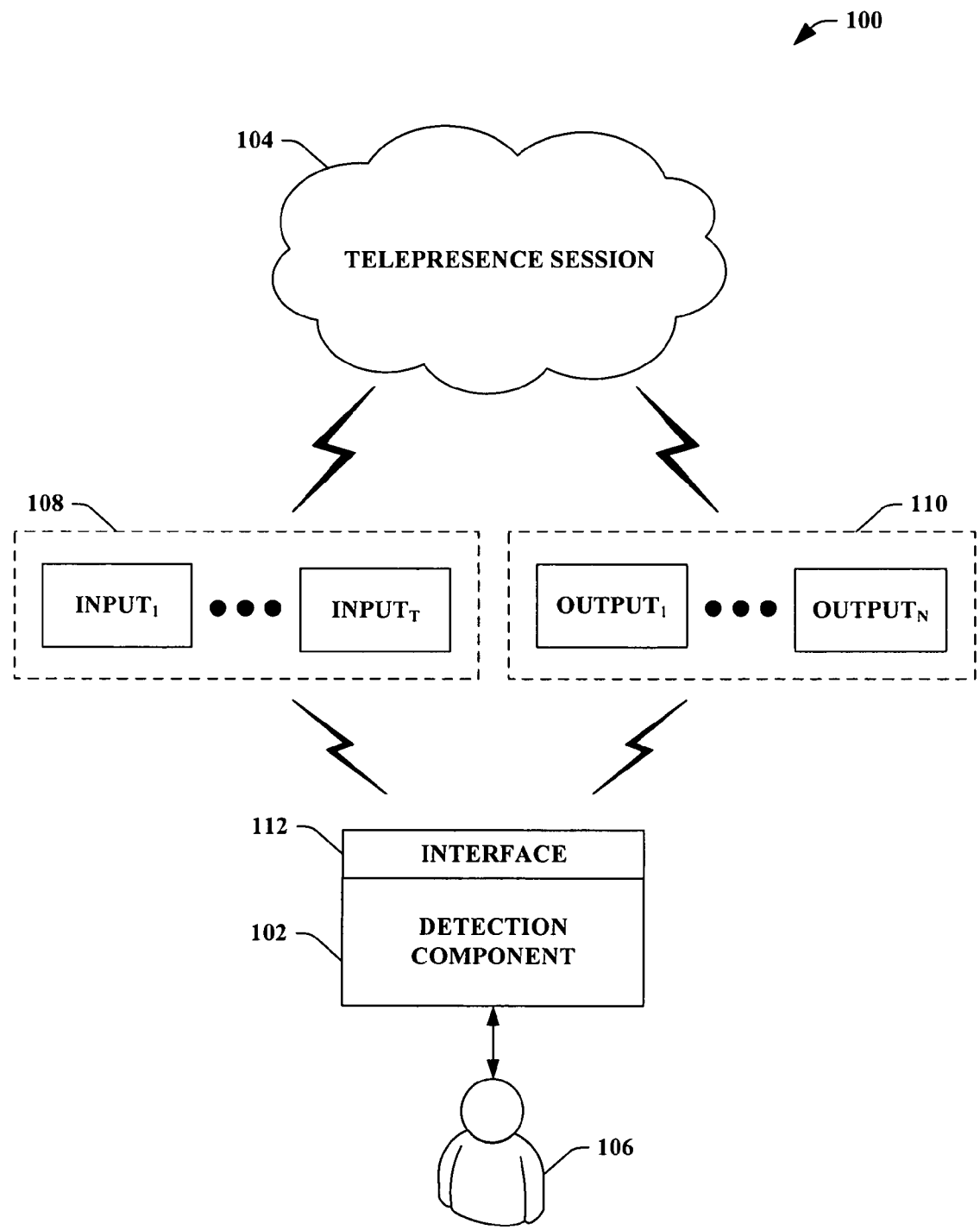
FIG. 1 illustrates a block diagram of an exemplary system that facilitates adjusting a device that interacts with a telepresence session based upon a detected cue.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "data store," "session," "engine," "module," "manager," "device," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates adjusting a device that interacts with a telepresence session based upon a detected cue. The system 100 can include a detection component 102 that can automatically adjust or adapt an input 108 or an output 110 associated with a device (not shown) that communicates with a telepresence session 104. In general, a user 106 can leverage a device that includes at least one of the input 108 or the output 110 in order to interact within the telepresence session 104. The detection component 102 can adjust settings related to the input 108 or the output 110 based upon the detected of a cue, wherein the cue can be, but is not limited to being, an event, a physical movement associated with the user 106, or an ambient variation. In other words, based upon detected cues related to the user 106 or a physical environment in which the user 106 resides, the detection component 102 can configure the input 108 or the output 110 accordingly.

For example, a user can utilize numerous devices with various inputs and outputs available for interaction or communication within a telepresence session. Based upon detected cues related to such user or the user's environment, selection of such devices and adjustments of respective inputs and outputs can be implemented in order to optimize the capabilities of interacting with the telepresence session. For example, sound can be received by microphones from numerous devices such as a laptop microphone, a stand-alone microphone, or a cell phone microphone. Based upon a detected cue such as movement, the sensitivity of the microphone can be adjusted as well as which microphone to utilize in order to receive sound/audio for the telepresence session. It is to be appreciated that any suitable device as well as any suitable inputs or outputs utilized in connection with a telepresence session can be manipulated, adjusted, or selected by the detection component 102.

The detection component 102 can seamlessly hand-off input or output responsibilities between a group or family of devices as well as adjustments settings related to such inputs and outputs. It is to be appreciated that there can be any suitable number of devices to which the system 100 can manage. Moreover, there can be any suitable number of inputs 108 for each device, such as $input_1$ to $input_T$, where T is a positive integer. Additionally, there can be any suitable number of outputs 110, such as $output_1$ to $output_N$, where N is a positive integer. For example, the input 108 can be any suitable input related to a device that can receive and transmit communications to the telepresence session 104. The input can receive data such as, but not limited to, a portion of audio, a portion of video, a portion of a graphic, a portion of text, a portion of a gesture, a movement, a portion of a video, a portion of a live video feed, a photo, a picture, etc. In an additional example, the output 110 can be any suitable output related to a device that can receive and transmit communications from the telepresence session 104. The output can transmit data such as, but not limited to, a portion of audio, a portion of video, a portion of a graphic, a portion of text, a portion of a video, a portion of a live video feed, a photo, a picture, a portion of displayable data, etc.

In an example, a user can utilize a group of devices based upon location to which the virtually represented user is participating with the telepresence session 104. Initially, a user can be utilizing a laptop (e.g., having respective inputs/outputs) in a meeting room to communicate with the telepresence session. The user can re-locate or be in transition from the meeting room to his or her automobile during such re-location, the subject innovation can detect and seamlessly hand-off communication from the laptop to a mobile device (e.g., smartphone, PDA, cellular device, etc.). Moreover, once within the automobile, the subject innovation can hand-off communication responsibilities from the mobile device to device(s) associated with the automobile (e.g., hands-free device, wireless linkage, etc.). For instance, during the transition from the meeting room to the automobile, the hand-off can be from the laptop to a smartphone, whereas the hand-off upon reaching the automobile can add additional devices for the communication with the telepresence session (e.g., wireless devices, hands-free devices, speakers, microphones, heads-up displays, etc.).

The telepresence session 104 (discussed in more detail in FIG. 5) can be a virtual environment in which two or more virtually represented users can communicate utilizing a communication framework. In general, a physical user can be represented within the telepresence session 104 in order to communicate to another user, entity (e.g., user, machine, computer, business, group of users, network, server, enterprise, device, etc.), and the like. For instance, the telepresence session 104 can enable two or more virtually represented users to communicate audio, video, graphics, images, data, files, documents, text, etc.

It is to be appreciated that the system 100 can adjust the collection of inputs for a user within the telepresence session 104 as well as adjust the collection of outputs for a user on the receiving end within the telepresence session 104. For example, the experience of the local people of seeing or hearing the remote participants when they (local people) are moving around say, in a room can be adjusted or manipulated. For example, A and B are two users involved in a telepresence session. They can see each other on a screen in front of them each. Now when A stands up and walks to the board, he may not see B anymore because the screen may not be visible. In that case, the telepresence session can find another screen in the room to move B's video so A can continue to see B. Similar logic holds good for audio. Moreover, the scenario is not just limited when A walks away from the screen. Even when A moves slightly, he can see a slightly different video of B on the screen simulating a "hole in the wall" experience.

In addition, the system 100 can include any suitable and/or necessary interface component 112 (herein referred to as "the interface 112"), which provides various adapters, connectors, channels, communication paths, etc. to integrate the detection component 102 into virtually any operating and/or database system(s) and/or with one another. In addition, the interface 112 can provide various adapters, connectors, channels, communication paths, etc., that provide for interaction with the detection component 102, the telepresence session 104, the inputs 108, the outputs 110, and any other device and/or component associated with the system 100.

Figure 2:
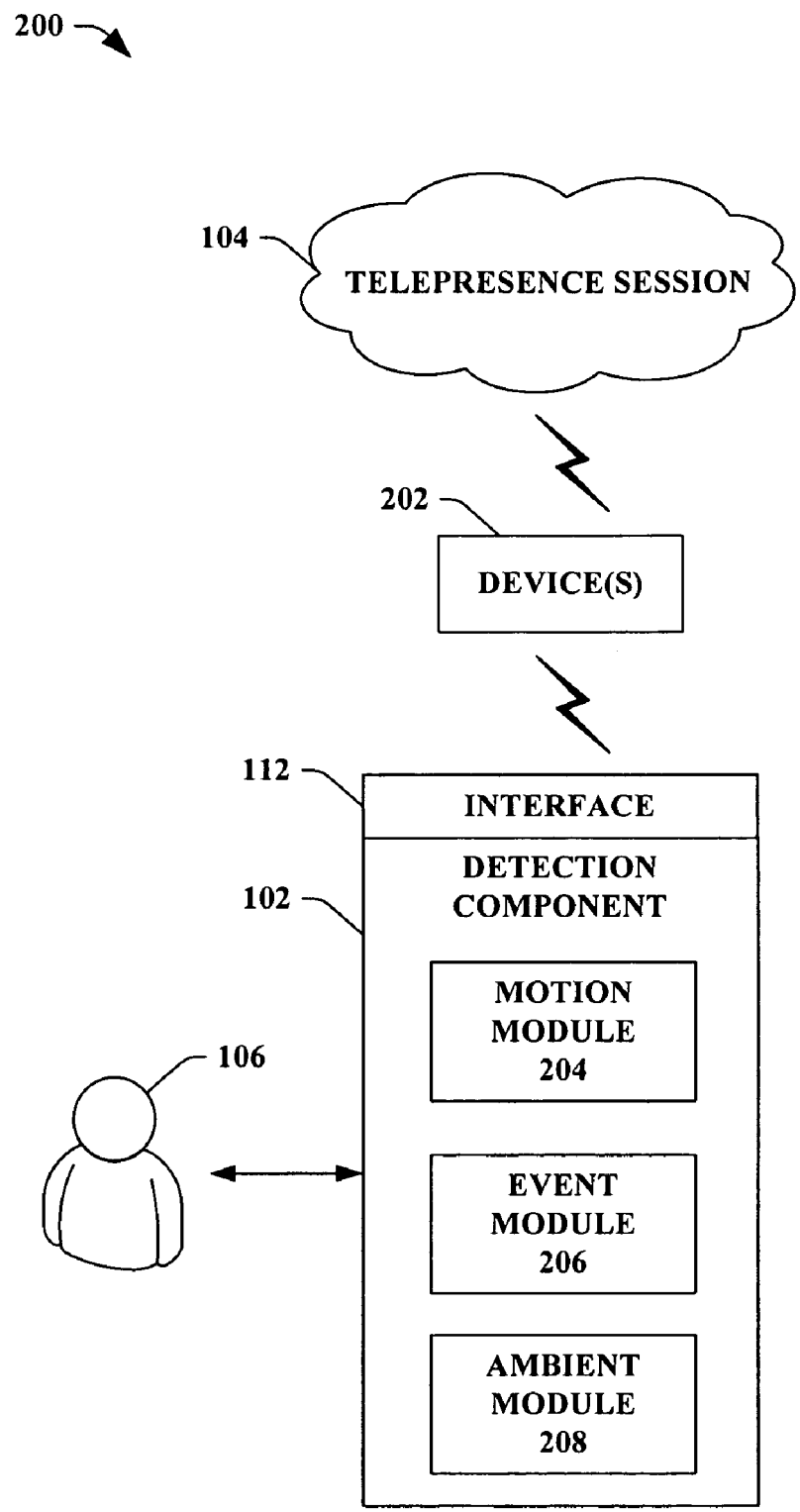
FIG. 2 illustrates a block diagram of an exemplary system that facilitates monitoring a user interacting within a telepresence session in order to adapt a device input or a device output.

FIG. 2 illustrates a system 200 that facilitates monitoring a user interacting within a telepresence session in order to adapt a device input or a device output. The system 200 can include the detection component 102 that can select at least one device 202 from a group or family of devices and adjust an input or an output related to such device in order to optimize interaction and/or communication within the telepresence session 104. The detection component 102 can monitor the user 106 in real time (e.g., in situ) in order to ascertain whether a device 202 selection (e.g., select a new device, maintain the selected device, seamless hand-off between two devices, etc.) shall be performed. Moreover, the detection component 102 can monitor the user 106 in order to adjust an input or an output related to the selected device 202.

It is to be appreciated that the device 202 can be any suitable device that can receive or transmit data from or to the telepresence session 104. The device 202 can be, but is not limited to being, a laptop, a smartphone, a desktop, a microphone, a live video feed, a web camera, a mobile device, a cellular device, a wireless device, a gaming device, a portable gaming device, a portable digital assistant (PDA), a headset, an audio device, a telephone, a tablet, a messaging device, a monitor, a camera, a media player, a portable media device, a browser device, a keyboard, a mouse, a touchpad, a speaker, a wireless Internet browser, a dedicated device or surrogate for telepresence, etc. Thus, any suitable input or output associated with such devices 202 can be adjusted based upon the detection of a cue from the detection component 102.

The detection component 102 can include a motion module 204 that can detect real time motion from the user 106. In particular, motion related to the user 106 can be detected as a cue in which such detected motion can trigger at least one of a 1) selection of a device for interaction or communication with the telepresence session 104; or 2) adjustment of an input or an output of the selected device utilized with the telepresence session 104. The motion module 204 can detect, for example, eye movement, geographic location, local proximity, hand motions, hand gestures, body motions (e.g., yawning, mouth movement, head movement, etc.), and the like. Based upon the detection of movement by the motion module 204, a device 202 can be selected and/or an input or output can be adjusted. For example, a user can be utilizing two or more devices that capture video and transmit such video to the telepresence session 104, wherein such devices can be in various locations within a meeting room to which the user resides. A first device can be located at a desk to capture video and a second device can be located at a whiteboard to capture video. Based on detected motion such as the user moving from the desk to the whiteboard, the detection motion can trigger a seamless hand-off from the first device to the second device in order to capture video from a more representative perspective. For example, the motion module 204 can detect motion utilizing a global positioning system (GPS), radio frequency identification (RFID) technology, optical motion tracking system (marker or markerless), inertial system, mechanical motion system, magnetic system, and the like. It is to be appreciated that it can take more than motion detection to understand that the user moved from their seat to the board. It's more of an activity or event detection. Motion detection, sound detection, RFID, infrared etc. are the low level cues that help in activity or event detection or inference. Thus, there can be a plurality of cues (e.g., high level cues and low level cues, etc.) that can enable the identification of a movement, motion, or event. For example low level cues can be motion detection, voice detection, GPS etc. Whereas a high level cue can be a higher level activity such as walking, speaking, looking at someone, walked up to the board, stepped out of the room, etc.

The detection component 102 can further include an event module 206 that can detect an event in real time, wherein such event can initiate the selection of a device 202 or an adjustment of an input or an output of such selected device. For example, the event can be, but is not limited to being, a pre-defined command (e.g., a voice command, a user-initiated command, etc.), a topic presented within the telepresence session 104, a portion of data presented within the telepresence session 104, a format/type of data presented, a change in a presenter within the telepresence session 104, what is being presented, a time lapse, an arrival within the session of virtually represented users, a departure from the session from virtually represented users, a break during the meeting, a manipulation of a shared document, a stroke on an input device (e.g., tablet, touch screen, white board, etc.), a loss of a network connection, etc. In one instance, a pre-defined command such as a voice command or a user initiated command (e.g., clicking of a button, etc.) can enable a device selection or an adjustment of an input or output of a selected device.

The detection component 102 can further include an ambient module that can enable detection of changes or variations in an environment, surroundings, or users. In general, an ambient cue such as a detected variation or change in the environment, surroundings, or with users, can trigger the selection of a device and/or an adjustment of an input or an output. For instance, the ambient module 208 can detect changes in the environment (e.g., room temperature, humidity, level of noise, etc.), surroundings (e.g., voice levels, background noise, etc.), and users (e.g., tone, excitement, boredom, emotion, blood pressure, heart rates, etc.). In one example, a meeting room can include high levels of background noise due to nearby construction. In such an example, this ambient cue detected (e.g., excessive background noise) can trigger at least one of a selection of more suitable devices or adjustment of inputs/outputs to alleviate such noise.

Figure 3:
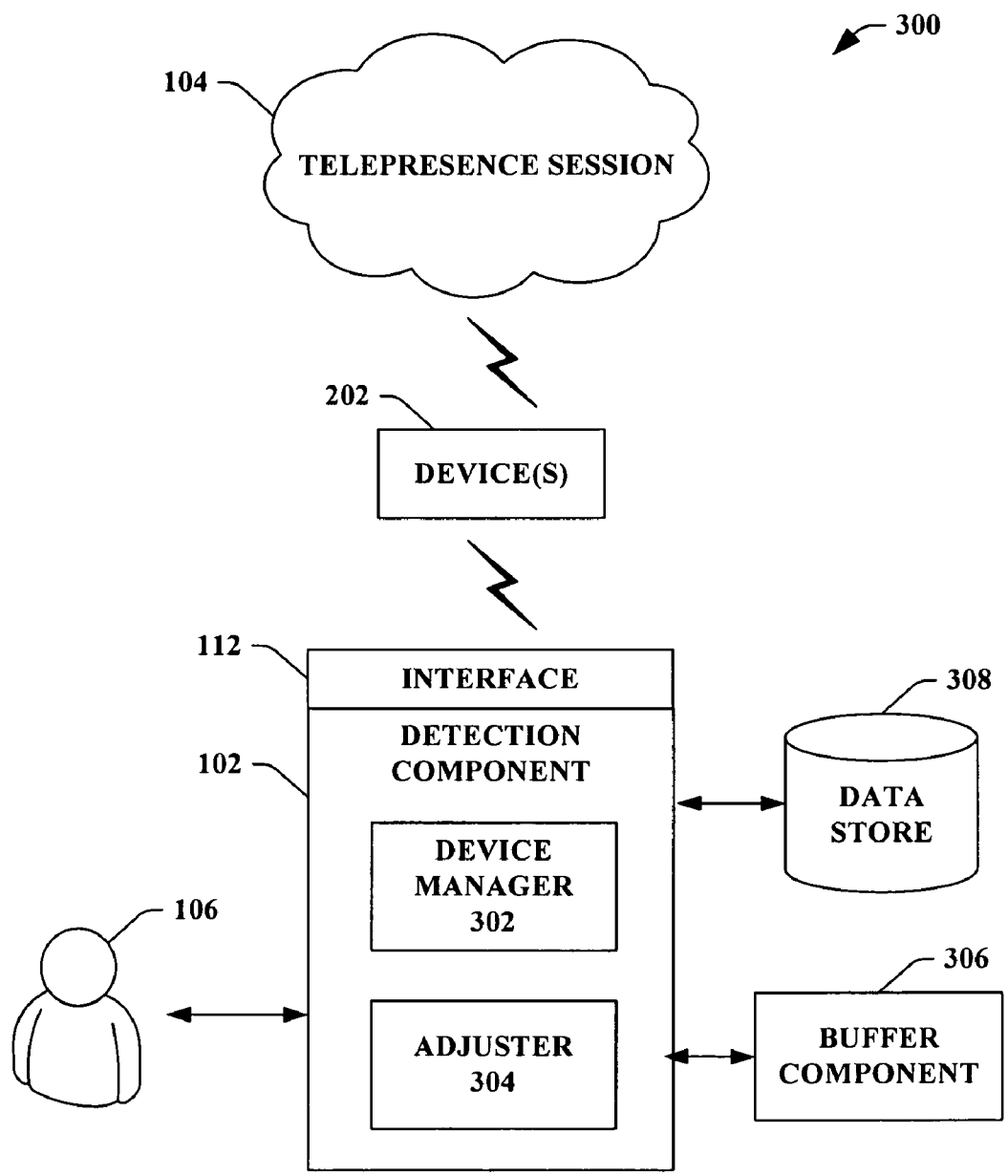
FIG. 3 illustrates a block diagram of an exemplary system that facilitates selecting a device to utilize for a telepresence session and adjusting various inputs or outputs.

FIG. 3 illustrates a system 300 that facilitates selecting a device to utilize for a telepresence session and adjusting various inputs or outputs. The system 300 can include the detection component 102 that optimally selects at least one device 202 to interact or communicate with the telepresence session 104. In particular, the detection component 102 can include a device manager 302 that can handle device selection based upon a cue and seamless hand-off between devices 202. Based upon a detected cue, the device manager 302 can evaluate the available devices 202 related to a virtually represented user and select an optimal device based upon the type of cue. For instance, the cue can be a transition based upon location (e.g., from one room to another, a desk location to a projector location, etc.) in which the device manager 302 can switch interaction with the telepresence session 104 from one device to another device.

The system 300 can further include an adjuster 304 that can adjust or adapt any suitable input or output setting or configuration in accordance with the detected cue. The adjuster 304 can identify the selected device and manage the available settings or configurations for the inputs and/or outputs for the selected device. The adjustment to an input can be, but is not limited to being, a microphone sensitivity, a noise cancellation, an angle, a perspective, a zoom, a pan, a focus, a resolution, a contrast, a brightness, a color adjustment, a gesture detection sensitivity, motion detection sensitivity, voice distortion, etc. Furthermore, the adjustment to an output can be, but is not limited to being, a volume, a resolution, brightness, a screen size, an object size, a contrast, a language, a screen position, a pixel ratio, a frequency, a refresh rate, a frame rate, etc. It is to be appreciated that an input and/or output device can move (e.g., movement, orientation, etc.) to adjust.

The system 300 can include a buffer component 306 that can track or record communications (e.g., interactions, data transfer, presentations, etc.) within the telepresence session 104 in order to allow a log that can be initiated for the user 106 based upon the user not attending such portion of the telepresence session 104. In other words, the buffer component 306 can enable a user virtually represented within the telepresence 104 to receive transmissions from the telepresence session 104 independent of attendance. Thus, a user can be virtually represented within a telepresence session and depart for a break (e.g., restroom, lunch, phone call, cellular call, etc.) and return. Based upon such return, the buffer component 306 can "catch up" the user to what he or she missed during such break. In another example, the buffer component 306 can provide information if a connectivity with the telepresence session is lost. The buffer component 306 can provide highlights, fast-paced video that tracked the session, a context of material missed, a remote-like experience (e.g., fast-forward, rewind, pause, etc.), and the like. In general, the buffer component 306 can enable a user to receive any communication within the telepresence session 104 regardless of his or her physical presence or interaction with the device 202.

The buffer component 306 can further employ an intelligent process (e.g., compress, speed up the playback of the buffered content, etc.). For example, the buffer component 306 can delete or skip long gaps in the buffered content (e.g., boring bits). Furthermore, the buffer component 306 can provide the ability to intelligently detect tone (e.g., excitement, animation, urgency via volume, pace (short gaps between speakers), etc.) and tag for rapid playback of the most important bits (e.g., useful in public safety, emergency situation, or black box type of application, etc.). The buffer component 306 can further combine with voice recognition and tagging to provide cueing as well as forensic benefits in public safety or black box applications.

For example, the buffer component 306 can be employed in an industrial scenario, an emergency scenario, combat scenario, high security scenario, a secret service sceanario, or a public safety. With such scenarios, a multitude of voices and communications can be occurring in which the buffer component 306 can manage and enable smart filtering in order to comprehend such chatter or overlapping communications. In another example, the buffer component 306 can filter out unwanted noise (e.g., sirens, gunfire, explosions, background noise, etc.) in order to allow replay or playback without such cluttering noises. In another example, the buffer component 306 can enable a user to focus a playback to a particular speaker in which only selected speakers can be played back. In still another example, the buffer component 306 can enable a true context or meaning to be interpreted from the buffered content or recording. Thus, a user can play back and speed through a buffer to get the true meaning.

For example, the buffer component 206 can handle a scenario where a participant has to step out of the telepresence session (e.g., the smart meeting room, etc.) for a time period during the telepresence session. For instance, the participant can see a high level very crisp summary update appearing on his/her device (e.g., PDA, mobile device, device utilized to communicate with the telepresence session, etc.) as the telepresence session continues with a picture/video/etc. of the current speaker. The participant may temporarily leave or not be in range/contact with a device to communicate with the telepresence session. In particular, the user can utilize an alarm (e.g., on participant speaking alarm, etc.) that can inform him/her when a specific participant is talking. Similarly, the participant temporarily out of contact or communication with the telepresence session can set an on subject changing alarm that can inform him/her when the subject is changing. It is to be appreciated that any suitable alarm or event can be utilized to trigger the designated notification for the participant that is out of communication with the telepresence session.

In another instance, when a participant steps out of the automatically initiated telepresence session and comes back, he/she can be automatically updated with pertinent information to quickly catch-up with the current state of the meeting/session. For example, the telepresence session can detect topics and changes in such topics during the telepresence session (e.g., using the meeting agenda content, context change in the discussion, etc). When a participant step out of the session during "Topic 1" and come back during "Topic 2", the telepresence session can suggest to give directly a quick summary on where the meeting is on "Topic 2" so far so the participant can efficiently jump back into the current discussion, and get an update on "Topic 1" later on. In yet another instance, the degree of summarization can vary within the same topic. For example, if the participant comes back in the room after "Topic 2" has been discussed for a while, he/she would get a very crisp summary of the beginning of "Topic 2" with outcomes, a less summarized middle part, and the last 3 sentences in full. Moreover, the above concepts can be applied for participants that join the telepresence session after the start time of the session.

The system 300 can further include a data store 308 that can include any suitable data related to the detection component 102, the telepresence session 104, the user 106, the device(s) 202, the device manager 302, the adjuster 304, the motion module (not shown), the event module (not shown), the ambient module (not shown), etc. For example, the data store 308 can include, but not limited to including, available devices for virtually represented users, inputs for devices, outputs for devices, cues, detected motions, detected events, ambient variations, adjustments for inputs, adjustments for outputs, user tendencies, user preferences, user data (e.g., location, devices, etc.), buffer information (e.g., settings, time settings, durations, logs, etc.), etc.

It is to be appreciated that the data store 308 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 308 of the subject systems and methods is intended to comprise, without being limited to, these and any other suitable types of memory. In addition, it is to be appreciated that the data store 308 can be a server, a database, a hard drive, a pen drive, an external hard drive, a portable hard drive, and the like.

Figure 4:
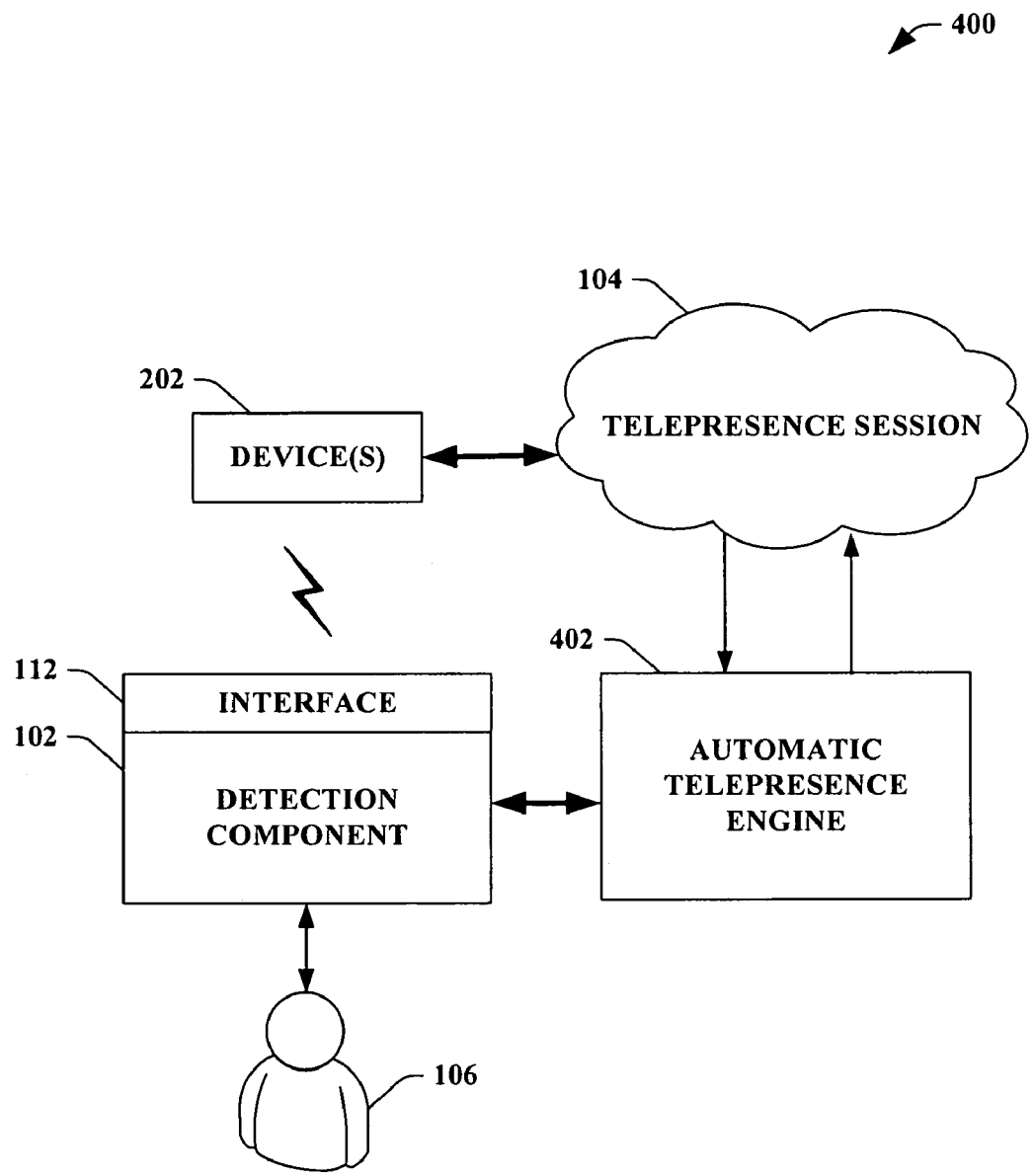
FIG. 4 illustrates a block diagram of an exemplary system that facilitates employing adjustment for a device utilized within an automatically initiated telepresence session.

FIG. 4 illustrates a system 400 that facilitates employing adjustment for a device utilized within an automatically initiated telepresence session. The system 400 can include the detection component 102 that can identify a cue, wherein such cue can trigger at least one of a device selection or an adjustment of an input/output setting for the selected device. The detection component 102 can be utilized with an automatic telepresence engine 402 that can automatically initiate a telepresence session 104 based upon collected and evaluated data. In general, the automatic telepresence engine 402 can start, conduct, and terminate the telepresence session without manual intervention. The automatic telepresence engine 402 can evaluate data in order to identify attendees (e.g., participants, virtually represented users that are to attend the telepresence session, etc.), data related to a presentation within the telepresence session, data related to a meeting topic within the telepresence session, and/or devices utilized by attendees to communicate within the telepresence session. Moreover, the automatic telepresence engine 402 can provide automated data archiving/capturing during the telepresence session that can track telepresence session minutes. With the telepresence session 104 being automatically tracked or recorded, a termination of such session can trigger the automatic telepresence session 402 to create and/or transmit a summary including events, topics, attendees, material discussed, etc. It is to be appreciated that such summary can include material discussed and can be shared.

By leveraging the automatic telepresence engine 402, various settings and configurations can be performed and implemented without user intervention or manual configuration. For example, typical virtual meetings require manual input or intervention such as meeting attendees, data required for the meeting, initiating meeting recordation (e.g., recording audio, recording video, etc.), activating data sharing (e.g., desktop/computer sharing, data files, etc.). However, the automatic telepresence engine 402 can automatically identify data, attendees, and recordation data in order to eliminate manual intervention or input. In other words, the automatic telepresence engine 402 can evaluate data in order to automatically initiate the telepresence session 104 with attendees (e.g., virtually represented users), data utilized for the session, and/or any other necessary data to conduct the telepresence session 104.

In particular, the automatic telepresence engine 402 can evaluate data associated with at least one of a virtually represented user, a schedule for a virtually represented user, a portion of an electronic communication for a virtually represented user, and/or any other suitable data identified to relate to at least one of the virtually represented user or the telepresence session 104. The automatic telepresence engine 402 can further identify at least one the following for a telepresence session based upon the evaluated data: a participant to include for the telepresence session, a portion of data related to a presentation within the telepresence session, a portion of data related to a meeting topic within the telepresence session, a device utilized by a virtually represented user to communicate within the telepresence session. With such evaluation and identification of data, the telepresence session 104 can be initiated, conducted, and recorded (e.g., tracked, monitored, archived, etc.) without active manual user intervention or input.

Figure 5:
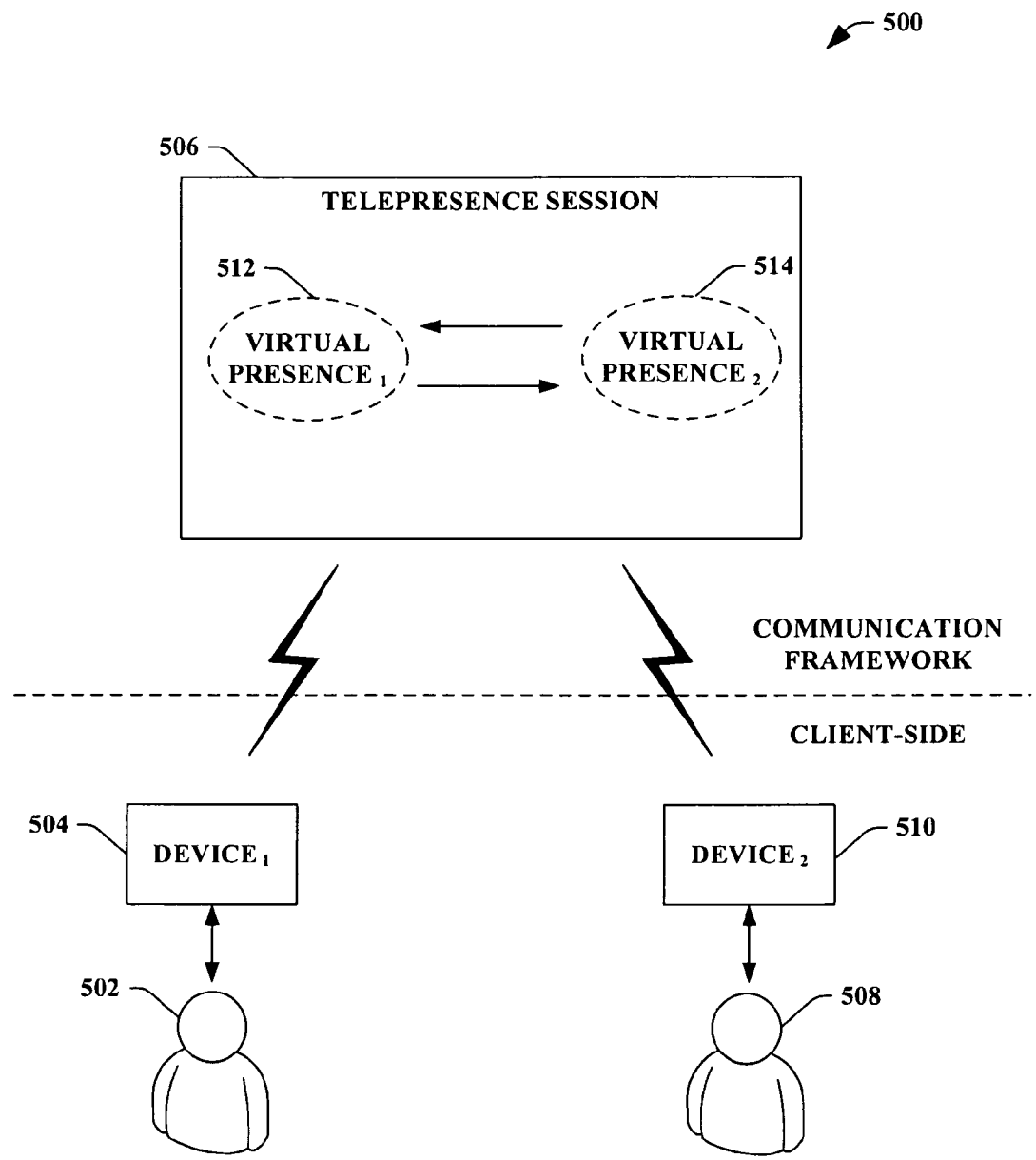
FIG. 5 illustrates a block diagram of exemplary system that facilitates enabling two or more virtually represented users to communicate within a telepresence session on a communication framework.

FIG. 5 illustrates a system 500 that facilitates enabling two or more virtually represented users to communicate within a telepresence session on a communication framework. The system 500 can include at least one physical user 502 that can leverage a device 504 on a client side in order to initiate a telepresence session 506 on a communication framework. Additionally, the user 502 can utilize the Internet, a network, a server, and the like in order to connect to the telepresence session 506 hosted by the communication framework. In general, the physical user 502 can utilize the device 504 in order to provide input for communications within the telepresence session 506 as well as receive output from communications related to the telepresence session 506. The device 504 can be any suitable device or component that can transmit or receive at least a portion of audio, a portion of video, a portion of text, a portion of a graphic, a portion of a physical motion, and the like. The device can be, but is not limited to being, a camera, a video capturing device, a microphone, a display, a motion detector, a cellular device, a mobile device, a laptop, a machine, a computer, etc. For example, the device 504 can be a web camera in which a live feed of the physical user 502 can be communicated for the telepresence session 506. It is to be appreciated that the system 500 can include a plurality of devices 504, wherein the devices can be grouped based upon functionality (e.g., input devices, output devices, audio devices, video devices, display/graphic devices, etc.).

The system 500 can enable a physical user 502 to be virtually represented within the telepresence session 506 for remote communications between two or more users or entities. The system 500 further illustrates a second physical user 508 that employs a device 510 to communicate within the telepresence session 506. As discussed, it is to be appreciated that the telepresence session 506 can enable any suitable number of physical users to communicate within the session. The telepresence session 506 can be a virtual environment on the communication framework in which the virtually represented users can communicate. For example, the telepresence session 506 can allow data to be communicated such as, voice, audio, video, camera feeds, data sharing, data files, etc.

Overall, the telepresence session 506 can simulate a real world or physical meeting place substantially similar to a business environment. Yet, the telepresence session 506 does not require participants to be physically present at a location. In order to simulate the physical real world business meeting, a physical user (e.g., the physical user 502, the physical user 508) can be virtually represented by a virtual presence (e.g., the physical user 502 can be virtually represented by a virtual presence 512, the physical user 508 can be represented by a virtual presence 514). It is to be appreciated that the virtual presence can be, but is not limited to being, an avatar, a video feed, an audio feed, a portion of a graphic, a portion of text, an animated object, etc.

For instance, a first user can be represented by an avatar, wherein the avatar can imitate the actions and gestures of the physical user within the telepresence session. The telepresence session can include as second user that is represented by a video feed, wherein the real world actions and gestures of the user are communicated to the telepresence session. Thus, the first user can interact with the live video feed and the second user can interact with the avatar, wherein the interaction can be talking, typing, file transfers, sharing computer screens, hand-gestures, application/data sharing, etc.

Figure 6:
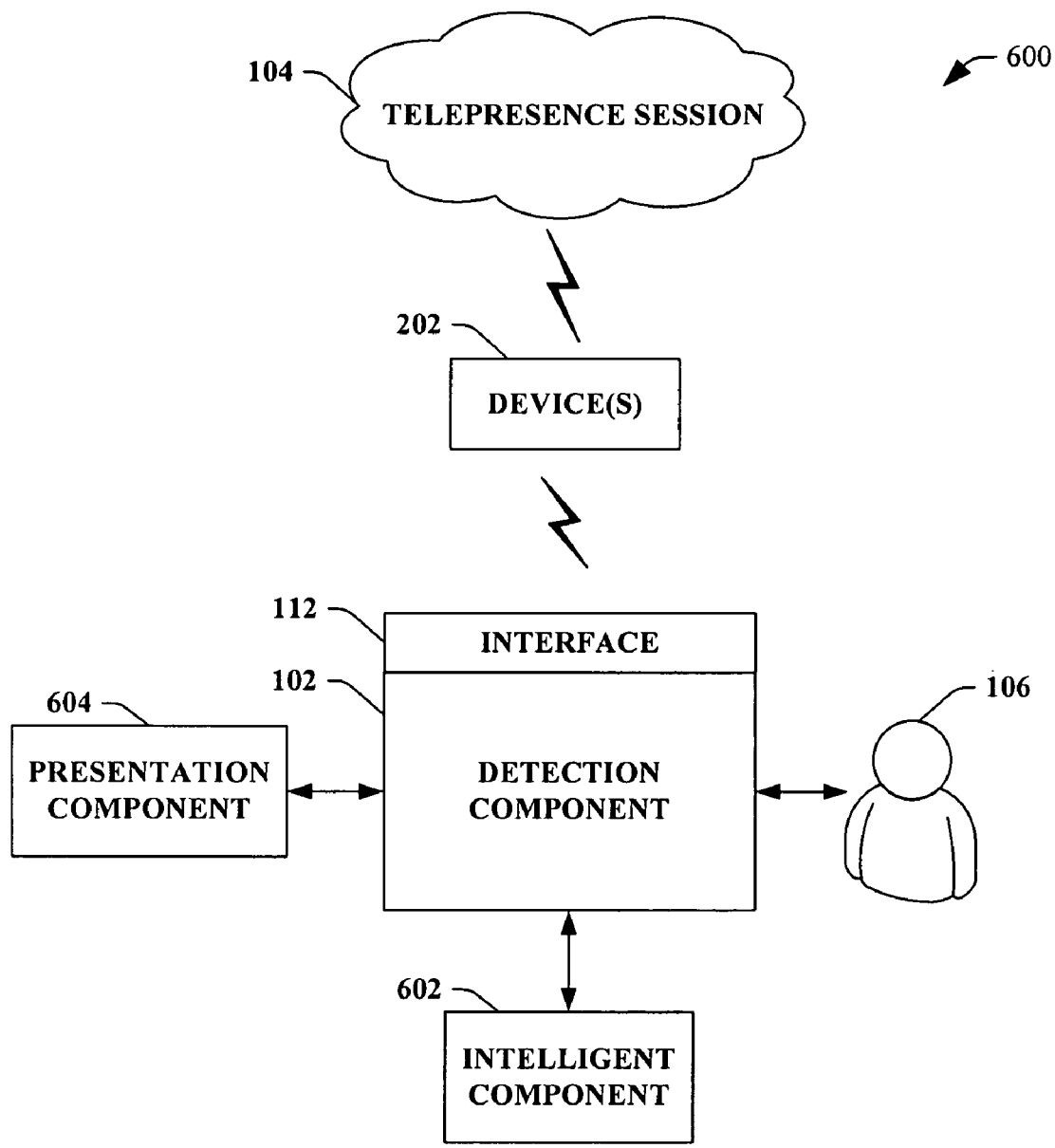
FIG. 6 illustrates a block diagram of an exemplary system that facilitates identifying a device to utilize for communication within a telepresence session and/or adjusting an input or output on the device based on a detection of a cue.

FIG. 6 illustrates a system 600 that employs intelligence to facilitate automatically identifying a device to utilize for communication within a telepresence session and/or adjusting an input or output on the device based on a detection of a cue. The system 600 can include the detection component 102, the telepresence session 104, the devices 202, device inputs (not shown), device outputs (not shown), the user 106, which can be substantially similar to respective components, sessions, devices, inputs, outputs, and users described in previous figures. The system 600 further includes an intelligent component 602. The intelligent component 602 can be utilized by the detection component 102 to facilitate identifying a cue that can trigger a device selection for communication within the telepresence session 104 or an adjustment of an input or an output associated with the selected device. For example, the intelligent component 602 can infer which available device to select, detected cues (e.g., motions, events, ambient variations, etc.), adjustments for a device input, adjustment for a device output, settings for an input, settings for an output, configuration for an input, configuration for an output, configuration for a device, leaves of absence from a telepresence session for buffering, playback settings for a user in regards to buffering, etc.

For example, the intelligent component 602 can employ a playback/summary in the inferred event that a participant has missed a portion of the telepresence session 104 (e.g., absent, temporary leave, lost network connection, etc.). In another example, there can be an array of devices that can be engaged at the same time. For instance, when a user walks up to a whiteboard, the user's video can be captured using a overview camera that sees both the user and the whiteboard, a special camera that can get a close up view on the user's face, microphones attached to the board, and the data stream from the board itself. When the users go back to their seat, another set of devices can be engaged.

The intelligent component 602 can employ value of information (VOI) computation in order to identify available devices to switch to and/or adjustments for inputs or outputs on a selected device. For instance, by utilizing VOI computation, the most ideal and/or appropriate devices and/or adjustments for inputs or outputs can be determined. Moreover, it is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

The detection component 102 can further utilize a presentation component 604 that provides various types of user interfaces to facilitate interaction between a user and any component coupled to the detection component 102. As depicted, the presentation component 604 is a separate entity that can be utilized with the detection component 102. However, it is to be appreciated that the presentation component 604 and/or similar view components can be incorporated into the detection component 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the detection component 102.

The user can also interact with the regions to select and provide information via various devices such as a mouse, a roller ball, a touchpad, a keypad, a keyboard, a touch screen, a pen and/or voice activation, a body motion detection, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, EGA, VGA, SVGA, etc.) with limited graphic support, and/or low bandwidth communication channels.

Figure 7:
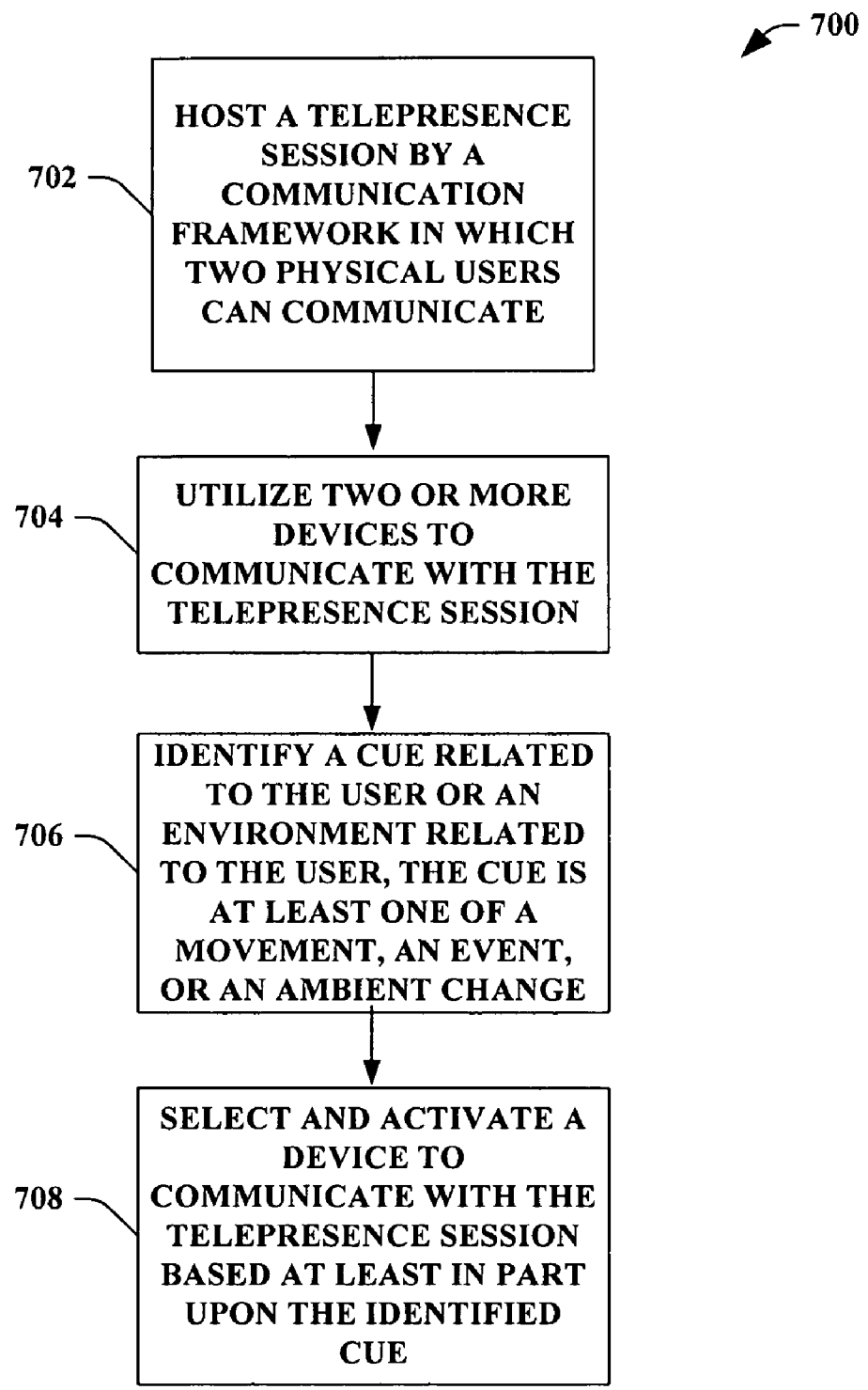
FIG. 7 illustrates an exemplary methodology for selecting a device that interacts with a telepresence session based upon a detected cue.
Figure 8:
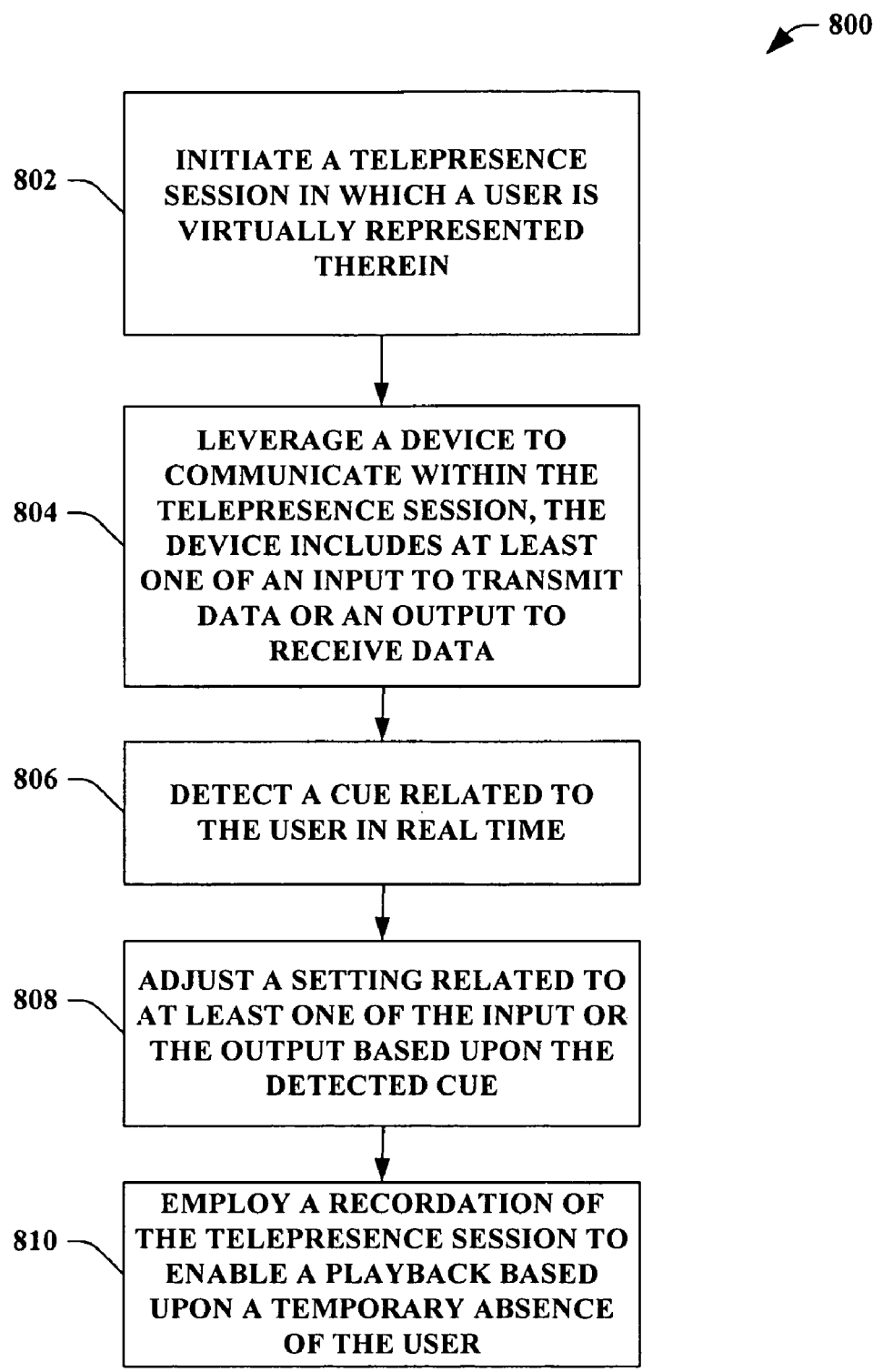
FIG. 8 illustrates an exemplary methodology that facilitates optimally selecting devices and inputs or outputs on a device for interaction within a telepresence session.

FIGS. 7-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a method 700 that facilitates selecting a device that interacts with a telepresence session based upon a detected cue. At reference numeral 702, a telepresence session can be hosted by a communication framework in which two physical users can communicate. At reference numeral 704, two or more devices can be utilized to communicate with the telepresence session. It is to be appreciated that the device can be, but is not limited to being, a laptop, a smartphone, a desktop, a microphone, a live video feed, a web camera, a mobile device, a cellular device, a wireless device, a gaming device, a portable gaming device, a portable digital assistant (PDA), a headset, an audio device, a telephone, a tablet, a messaging device, a monitor, a camera, a media player, a portable media device, a browser device, a keyboard, a mouse, a touchpad, a speaker, a wireless Internet browser, a dedicated device or surrogate for telepresence etc.

At reference numeral 706, a cue related to the user or an environment related to the user can be identified, wherein the cue is at least one of a movement, an event, or an ambient change. It is to be appreciated that the cue can be detected or identified in real time. The movement can be, but is not limited to being, eye movement, geographic location, local proximity, hand motions, hand gestures, body motions (e.g., yawning, mouth movement, head movement, etc.), and the like. For example, the event can be, but is not limited to being, a pre-defined command (e.g., a voice command, a user-initiated command, etc.), a topic presented within the telepresence session 104, a portion of data presented within the telepresence session 104, a format/type of data presented, a change in a presenter within the telepresence session 104, what is being presented, a time lapse, an arrival within the session of virtually represented users, a departure from the session from virtually represented users, a break during the meeting, a manipulation of a shared document, a stroke on an input device (e.g., tablet, touch screen, white board, etc.), a loss of a network connection, etc. The ambient change can be related to, for instance, changes in the environment (e.g., room temperature, humidity, level of noise, etc.), surroundings (e.g., voice levels, background noise, etc.), users (e.g., tone, excitement, boredom, emotion, blood pressure, heart rates, etc.), and the like.

At reference numeral 708, a device can be selected and activated to communicate with the telepresence session based at least in part upon the identified cue. In other words, based upon a received cue, communication (e.g., receipt of data, transmission of data, etc.) within the telepresence session can be seamlessly handed off between devices in order to provide enhanced and optimal interaction within such telepresence session.

FIG. 8 illustrates a method 800 for optimally selecting devices and inputs or outputs on a device for interaction within a telepresence session. At reference numeral 802, a telepresence session can be initiated in which a user is virtually represented therein. At reference numeral 804, a device can be leveraged to communicate within the telepresence session, wherein the device includes at least one of an input to transmit data or an output to receive data. At reference numeral 806, a cue related to the user can be detected in real time. For example, the cue can be associated with the user or a user's environment and can be, but is not limited to being, a detected motion, an event detection, or an ambient variation.

At reference numeral 808, a setting related to at least one of the input or the output can be adjusted based upon the detected cue. The adjustment to an input can be, but is not limited to being, a microphone sensitivity, a noise cancellation, an angle, a perspective, a zoom, a pan, a focus, a resolution, a contrast, a brightness, a color adjustment, a gesture detection sensitivity, motion detection sensitivity, voice distortion, etc. Furthermore, the adjustment to an output can be, but is not limited to being, a volume, a resolution, brightness, a screen size, an object size, a contrast, a language, a screen position, a pixel ratio, a frequency, a refresh rate, a frame rate, etc. It is to be appreciated that an input and/or output device can move to adjust. At reference numeral 810, a recordation of the telepresence session can be employed to enable a playback based upon a temporary absence of at least one of the users. In other words, a temporary absence from a telepresence session by a user can be tracked and recorded in order to allow the user to "catch up" or receive tracked information (e.g., user control, fast forward, fast rewind, pause, play, rewind, seek, etc.).

Figure 9:
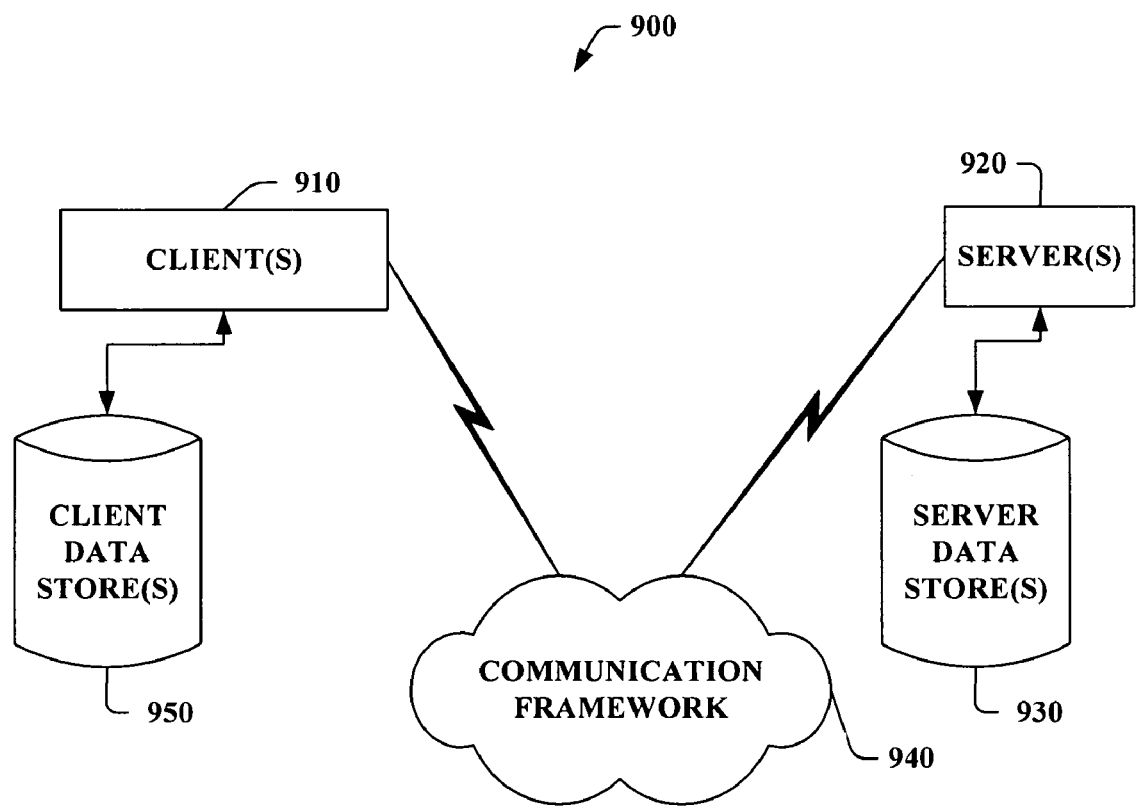
FIG. 9 illustrates an exemplary networking environment, wherein the novel aspects of the claimed subject matter can be employed.
Figure 10:
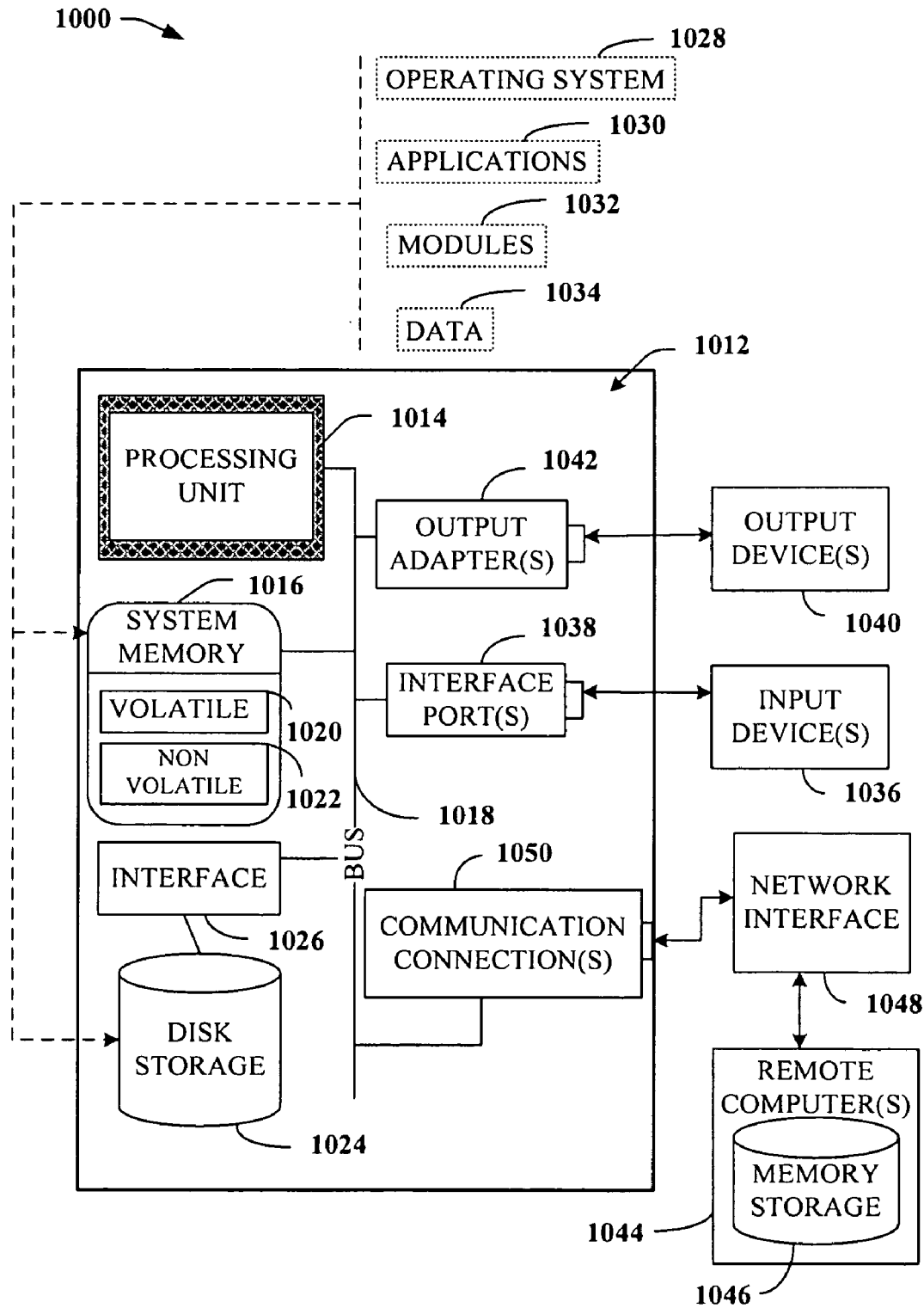
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, a detection component can monitor cues from a user virtually represented within a telepresence session in order to adjust devices, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system that facilitates managing devices utilized for communicating data within a telepresence session, comprising:
    a telepresence session initiated within a communication framework that enables a first virtually represented user to communicate with a second virtually represented user therein;
    a plurality of devices utilized by the first virtually represented user to enable communication within the telepresence session, at least one device includes at least one of an input to transmit a portion of the communication to the telepresence session or an output to receive another portion of the communication from the telepresence session;

a buffer component that records a portion of the telepresence session based upon a detection of a temporary absence of the first virtually represented user from the telepresence session in the midst of the telepresence session; and a detection component that adjusts at least one of the input related to the at least one device or the output related to the at least one device based upon an identification of a cue, the cue comprising at least one of a movement detected, an event detected, or an ambient variation.

2. The system of claim 1, wherein the at least one device comprises a laptop, a smartphone, a desktop, a microphone, a live video feed, a web camera, a mobile device, a cellular device, a wireless device, a gaming device, a portable gaming device, a portable digital assistant (PDA), a headset, an audio device, a telephone, a tablet, a messaging device, a monitor, a camera, a media player, a portable media device, a browser device, a keyboard, a mouse, a touchpad, a speaker, a dedicated device for telepresence, a surrogate device for telepresence, and/or a wireless Internet browser.

3. The system of claim 1, further comprising a motion module that detects the movement in situ, the movement is detected with:
  a low level cue comprising a motion detection, a hand motion, a hand gesture, and/or a body motion; or
  a high level cue comprising an activity of a virtually represented user, walking, speaking, looking at someone, walking to a disparate location, and/or stepping out of the room.

4. The system of claim 3, the motion module leverages at least one of a global positioning system (GPS) a radio frequency identification (RFID) component to detect the movement, an optical motion tracking system, an inertial system, a mechanical motion system, or a magnetic system to detect the movement.

5. The system of claim 1, further comprising an event module that detects the event in situ, the event comprising a pre-defined command, a voice command, a user-initiated command, a topic presented within the telepresence session, a portion of data presented within the telepresence session, a format of data presented, a type of data presented, a change in a presenter within the telepresence session, a time lapse, a user arrival within the telepresence session, a user departure from the telepresence session, a manipulation of a shared document, a stroke on an input device, a loss of a network connection, and/or a break during the telepresence session.

6. The system of claim 1, further comprising an ambient module that detect a change in at least one of the user or an environment to which the user resides, the ambient change comprising a room temperature, an amount of humidity, a level of noise, a voice level, a background noise, a user body language, a tone from the user, a user excitement, a level boredom for the user, an emotion from the user, a blood pressure related to the user, and/or a heart rate for the user.

7. The system of claim 1, further comprising a device manager that evaluates the plurality of devices utilized by the first virtually represented user to interact with the telepresence session and employs a seamless hand-off from one device to another disparate device based upon a detection of the cue.

8. The system of claim 1, further comprising an adjuster that adapts at least one setting for the input related to the at least one device, the input comprising a microphone sensitivity, a noise cancellation, an angle, a perspective, a zoom, a pan, a focus, a resolution, a contrast, a brightness, a color adjustment, a gesture detection sensitivity, a motion detection sensitivity, and/or a voice distortion.

9. The system of claim 8, the adjuster further adapts at least one setting for the output related to the at least one device, the output comprising a volume, a resolution, a brightness, a screen size, an object size, a contrast, a language, a screen position, a pixel ratio, a frequency, a refresh rate, an input device movement, an output device movement, and/or a frame rate.

10. The system of claim 1, wherein the temporary absence of the first virtually represented user comprises a lost connection, arriving late, and/or stepping out of the telepresence session.

11. The system of claim 10, the buffer component enables a playback of the recorded portion of the telepresence session based upon at least one of a return of at least one of the users to the telepresence or a return of the lost connection.

12. The system of claim 11, the playback enables a user control, the user control is at least one of a pause, a rewind, a fast forward, a fast rewind, a seek, a search, or a play.

13. The system of claim 10, wherein the buffer component delivers data tracked during the absence to the user, the data comprising a highlight, a portion of video, a fast-paced video, a portion of text, a portion of a graphic, and/or a portion of a word processing document.

14. The system of claim 1, further comprising an automatic telepresence engine that automatically initiates the telepresence session within the communication framework.

15. The system of claim 14, wherein the automatic telepresence engine evaluates data associated with at least one of the first virtually represented user, a schedule for the first virtually represented user, or a portion of an electronic communication for the first virtually represented user.

16. The system of claim 15, wherein, based on the evaluated data, the automatic telepresence engine identifies a participant to include for the telepresence session, a portion of data related to a presentation within the telepresence session, a portion of data related to a meeting topic within the telepresence session, a device utilized by the first virtually represented user to communicate within the telepresence session.

17. A computer-implemented system that facilitates managing a device utilized for communicating data within a telepresence session, comprising:
  means for initiating a telepresence session within a communication framework that includes two or more virtually represented users that communicate therein;
  means for utilizing a group of devices to enable communication within the telepresence session, at least one device includes at least one of an input to transmit a portion of a communication to the telepresence session or an output to receive a portion of a communication from the telepresence session;
  means for selecting at least one device from the group of devices to communicate with the telepresence session based upon the identification of a cue;
  means for adjusting at least one of the input related to the selected device or the output related to the selected device based upon the identification of the cue, the cue is at least one of a movement detected, an event detected, or an ambient variation; and
  means for recording a portion of the telepresence session to enable a playback of the recorded portion based upon a temporary absence of the user from the telepresence session.

18. A method comprising:
  conducting a telepresence session between a first user and one or more second users using one or more devices, the one or more devices enabling the first user to communicate with the one or more second users;

determining a temporary absence of the first user from the telepresence session in the midst of the telepresence session;

in response to determining the temporary absence of the first user from the telepresence session in the midst of the telepresence session, initializing a recordation of the telepresence session to enable a playback of a portion of the telepresence session that the first user has missed, and virtually representing the first user within the telepresence session.

19. The method of claim 18, further comprising playing back to the first user the portion of the telepresence session or a summary of the portion of the telepresence session that the first user has missed.

20. The method of claim 18, wherein the virtually representing enables the first user to receive communication within telepresence session regardless of a physical presence of the first user with respect to the one or more devices.

* * * * *